US009501398B2

(12) United States Patent
George et al.

(10) Patent No.: US 9,501,398 B2
(45) Date of Patent: Nov. 22, 2016

(54) PERSISTENT STORAGE DEVICE WITH NVRAM FOR STAGING WRITES

(71) Applicant: SanDisk Technologies LLC, Plano, TX (US)

(72) Inventors: Johann George, Sunnyvale, CA (US);
Aaron Olbrich, Morgan Hill, CA (US);
Brian O'Krafka, Austin, TX (US);
Darpan Dinker, Fremont, CA (US);
Patrick Chiu, Cupertino, CA (US);
Evgeny Firsov, Palo Alto, CA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 174 days.

(21) Appl. No.: 13/831,218

(22) Filed: Mar. 14, 2013

(65) Prior Publication Data

US 2014/0181373 A1    Jun. 26, 2014

Related U.S. Application Data

(60) Provisional application No. 61/746,079, filed on Dec. 26, 2012.

(51) Int. Cl.
*G06F 12/00* (2006.01)
*G06F 3/06* (2006.01)
*G06F 12/02* (2006.01)

(52) U.S. Cl.
CPC ......... *G06F 12/0246* (2013.01); *G06F 3/0616* (2013.01); *G06F 3/0656* (2013.01); *G06F 3/0679* (2013.01); *G06F 2212/7203* (2013.01)

(58) Field of Classification Search
CPC ............. G06F 12/0246; G06F 3/0616; G06F 3/0656; G06F 3/0679; G06F 2212/7203
See application file for complete search history.

(56) References Cited

U.S. PATENT DOCUMENTS

| 4,173,737 A | 11/1979 | Skerlos et al. |
| 4,888,750 A | 12/1989 | Kryder et al. |

(Continued)

FOREIGN PATENT DOCUMENTS

| EP | 1 299 800 | 4/2003 |
| EP | 1465203 A1 | 10/2004 |

(Continued)

OTHER PUBLICATIONS

International Search Report and Written Opinion dated Jul. 25, 2014, received in International Patent Application No. PCT/US2014/029453, which corresponds to U.S. Appl. No. 13/963,444, 9 pages (Frayer).

(Continued)

*Primary Examiner* — Aracelis Ruiz
(74) *Attorney, Agent, or Firm* — Morgan, Lewis & Bockius LLP (57) ABSTRACT

A persistent storage device includes both persistent storage, which includes a set of persistent storage blocks, and NVRAM, and in particular a set of NVRAM blocks. The persistent storage device also typically includes a storage controller. The persistent storage device, in addition to responding to commands to write data directly to and to read data directly from persistent storage blocks is also configured to write data to specified NVRAM blocks (e.g., specified by a host NVRAM write command) and to transfer data from a specified NVRAM block to a specified persistent storage block. As a result, multiple writes to a particular persistent storage block can be replaced with multiple writes to an NVRAM block and a subsequent single write to the particular persistent storage block. This reduces the number of writes to persistent storage and also reduces the number of corresponding block erase operations.

23 Claims, 6 Drawing Sheets

(56) References Cited

U.S. PATENT DOCUMENTS

| | | | |
|---|---|---|---|
| 4,916,652 A | 4/1990 | Schwarz et al. |
| 5,129,089 A | 7/1992 | Nielsen |
| 5,270,979 A | 12/1993 | Harari et al. |
| 5,329,491 A | 7/1994 | Brown et al. |
| 5,381,528 A | 1/1995 | Brunelle |
| 5,488,702 A | 1/1996 | Byers et al. |
| 5,519,847 A | 5/1996 | Fandrich et al. |
| 5,530,705 A | 6/1996 | Malone, Sr. |
| 5,537,555 A | 7/1996 | Landry et al. |
| 5,551,003 A | 8/1996 | Mattson et al. |
| 5,636,342 A | 6/1997 | Jeffries |
| 5,657,332 A | 8/1997 | Auclair et al. |
| 5,666,114 A | 9/1997 | Brodie et al. |
| 5,708,849 A | 1/1998 | Coke et al. |
| 5,765,185 A | 6/1998 | Lambrache et al. |
| 5,890,193 A | 3/1999 | Chevallier |
| 5,930,188 A | 7/1999 | Roohparvar |
| 5,936,884 A | 8/1999 | Hasbun et al. |
| 5,943,692 A | 8/1999 | Marberg et al. |
| 5,946,714 A | 8/1999 | Miyauchi |
| 5,982,664 A | 11/1999 | Watanabe |
| 6,000,006 A | 12/1999 | Bruce et al. |
| 6,006,345 A | 12/1999 | Berry, Jr. |
| 6,016,560 A | 1/2000 | Wada et al. |
| 6,018,304 A | 1/2000 | Bessios |
| 6,044,472 A | 3/2000 | Crohas |
| 6,070,074 A | 5/2000 | Perahia et al. |
| 6,119,250 A | 9/2000 | Nishimura et al. |
| 6,138,261 A | 10/2000 | Wilcoxson et al. |
| 6,182,264 B1 | 1/2001 | Ott |
| 6,192,092 B1 | 2/2001 | Dizon et al. |
| 6,260,120 B1 | 7/2001 | Blumenau et al. |
| 6,295,592 B1 | 9/2001 | Jeddeloh |
| 6,311,263 B1 | 10/2001 | Barlow et al. |
| 6,408,394 B1 | 6/2002 | Vander Kamp et al. |
| 6,412,042 B1 * | 6/2002 | Paterson et al. ............. 711/112 |
| 6,442,076 B1 | 8/2002 | Roohparvar |
| 6,449,625 B1 | 9/2002 | Wang |
| 6,484,224 B1 | 11/2002 | Robins et al. |
| 6,516,437 B1 | 2/2003 | Van Stralen et al. |
| 6,564,285 B1 | 5/2003 | Mills et al. |
| 6,647,387 B1 | 11/2003 | McKean et al. |
| 6,678,788 B1 | 1/2004 | O'Connell |
| 6,728,879 B1 | 4/2004 | Atkinson |
| 6,757,768 B1 | 6/2004 | Potter et al. |
| 6,775,792 B2 | 8/2004 | Ulrich et al. |
| 6,810,440 B2 | 10/2004 | Micalizzi, Jr. et al. |
| 6,836,808 B2 | 12/2004 | Bunce et al. |
| 6,836,815 B1 | 12/2004 | Purcell et al. |
| 6,842,436 B2 | 1/2005 | Moeller |
| 6,865,650 B1 | 3/2005 | Morley et al. |
| 6,871,257 B2 | 3/2005 | Conley et al. |
| 6,895,464 B2 | 5/2005 | Chow et al. |
| 6,966,006 B2 | 11/2005 | Pacheco et al. |
| 6,978,343 B1 | 12/2005 | Ichiriu |
| 6,980,985 B1 | 12/2005 | Amer-Yahia et al. |
| 6,981,205 B2 | 12/2005 | Fukushima et al. |
| 6,988,171 B2 | 1/2006 | Beardsley et al. |
| 7,020,017 B2 | 3/2006 | Chen et al. |
| 7,024,514 B2 | 4/2006 | Mukaida et al. |
| 7,028,165 B2 | 4/2006 | Roth et al. |
| 7,032,123 B2 | 4/2006 | Kane et al. |
| 7,043,505 B1 | 5/2006 | Teague et al. |
| 7,076,598 B2 | 7/2006 | Wang |
| 7,100,002 B2 | 8/2006 | Shrader et al. |
| 7,102,860 B2 | 9/2006 | Wenzel |
| 7,111,293 B1 | 9/2006 | Hersh et al. |
| 7,126,873 B2 | 10/2006 | See et al. |
| 7,133,282 B2 | 11/2006 | Sone |
| 7,155,579 B1 | 12/2006 | Neils et al. |
| 7,162,678 B2 | 1/2007 | Saliba |
| 7,173,852 B2 | 2/2007 | Gorobets et al. |
| 7,184,446 B2 | 2/2007 | Rashid et al. |
| 7,275,170 B2 | 9/2007 | Suzuki |
| 7,295,479 B2 | 11/2007 | Yoon et al. |
| 7,328,377 B1 | 2/2008 | Lewis et al. |
| 7,516,292 B2 | 4/2009 | Kimura et al. |
| 7,523,157 B2 | 4/2009 | Aguilar, Jr. et al. |
| 7,527,466 B2 | 5/2009 | Simmons |
| 7,529,466 B2 | 5/2009 | Takahashi |
| 7,533,214 B2 | 5/2009 | Aasheim et al. |
| 7,546,478 B2 | 6/2009 | Kubo et al. |
| 7,566,987 B2 | 7/2009 | Black et al. |
| 7,571,277 B2 | 8/2009 | Mizushima |
| 7,574,554 B2 | 8/2009 | Tanaka et al. |
| 7,596,643 B2 | 9/2009 | Merry, Jr. et al. |
| 7,681,106 B2 | 3/2010 | Jarrar et al. |
| 7,685,494 B1 | 3/2010 | Varnica et al. |
| 7,707,481 B2 | 4/2010 | Kirschner et al. |
| 7,761,655 B2 | 7/2010 | Mizushima et al. |
| 7,765,454 B2 | 7/2010 | Passint |
| 7,774,390 B2 | 8/2010 | Shin |
| 7,840,762 B2 | 11/2010 | Oh et al. |
| 7,870,326 B2 | 1/2011 | Shin et al. |
| 7,890,818 B2 | 2/2011 | Kong et al. |
| 7,913,022 B1 | 3/2011 | Baxter |
| 7,925,960 B2 | 4/2011 | Ho et al. |
| 7,934,052 B2 | 4/2011 | Prins et al. |
| 7,945,825 B2 | 5/2011 | Cohen et al. |
| 7,954,041 B2 | 5/2011 | Hong et al. |
| 7,971,112 B2 | 6/2011 | Murata |
| 7,974,368 B2 | 7/2011 | Shieh et al. |
| 7,978,516 B2 | 7/2011 | Olbrich et al. |
| 7,996,642 B1 | 8/2011 | Smith |
| 8,006,161 B2 | 8/2011 | Lestable et al. |
| 8,032,724 B1 | 10/2011 | Smith |
| 8,041,884 B2 | 10/2011 | Chang |
| 8,042,011 B2 | 10/2011 | Nicolaidis et al. |
| 8,069,390 B2 | 11/2011 | Lin |
| 8,190,967 B2 | 5/2012 | Hong et al. |
| 8,250,380 B2 | 8/2012 | Guyot |
| 8,254,181 B2 | 8/2012 | Hwang et al. |
| 8,259,506 B1 | 9/2012 | Sommer et al. |
| 8,312,349 B2 | 11/2012 | Reche et al. |
| 8,412,985 B1 | 4/2013 | Bowers et al. |
| 8,429,436 B2 | 4/2013 | Fillingim et al. |
| 8,438,459 B2 | 5/2013 | Cho et al. |
| 8,453,022 B2 | 5/2013 | Katz |
| 8,554,984 B2 | 10/2013 | Yano et al. |
| 8,627,117 B2 | 1/2014 | Johnston |
| 8,634,248 B1 | 1/2014 | Sprouse et al. |
| 8,694,854 B1 | 4/2014 | Dar et al. |
| 8,724,789 B2 | 5/2014 | Altberg et al. |
| 8,832,384 B1 | 9/2014 | de la Iglesia |
| 8,885,434 B2 | 11/2014 | Kumar |
| 8,898,373 B1 | 11/2014 | Kang et al. |
| 8,909,894 B1 | 12/2014 | Singh et al. |
| 8,910,030 B2 | 12/2014 | Goel |
| 8,923,066 B1 | 12/2014 | Subramanian et al. |
| 9,128,690 B2 | 9/2015 | Lotzenburger et al. |
| 9,329,789 B1 | 5/2016 | Chu et al. |
| 2001/0026949 A1 | 10/2001 | Ogawa et al. |
| 2001/0050824 A1 | 12/2001 | Buch |
| 2002/0024846 A1 | 2/2002 | Kawahara et al. |
| 2002/0032891 A1 | 3/2002 | Yada et al. |
| 2002/0036515 A1 | 3/2002 | Eldridge et al. |
| 2002/0083299 A1 | 6/2002 | Van Huben et al. |
| 2002/0116651 A1 | 8/2002 | Beckert et al. |
| 2002/0122334 A1 | 9/2002 | Lee et al. |
| 2002/0152305 A1 | 10/2002 | Jackson et al. |
| 2002/0162075 A1 | 10/2002 | Talagala et al. |
| 2002/0165896 A1 | 11/2002 | Kim |
| 2003/0041299 A1 | 2/2003 | Kanazawa et al. |
| 2003/0043829 A1 | 3/2003 | Rashid et al. |
| 2003/0079172 A1 | 4/2003 | Yamagishi et al. |
| 2003/0088805 A1 | 5/2003 | Majni et al. |
| 2003/0093628 A1 | 5/2003 | Matter et al. |
| 2003/0163594 A1 | 8/2003 | Aasheim et al. |
| 2003/0163629 A1 | 8/2003 | Conley et al. |
| 2003/0188045 A1 | 10/2003 | Jacobson |
| 2003/0189856 A1 | 10/2003 | Cho et al. |
| 2003/0198100 A1 | 10/2003 | Matsushita et al. |
| 2003/0204341 A1 | 10/2003 | Guliani et al. |
| 2003/0212719 A1 | 11/2003 | Yasuda et al. |

(56) References Cited

U.S. PATENT DOCUMENTS

| | | |
|---|---|---|
| 2003/0225961 A1 | 12/2003 | Chow et al. |
| 2004/0024957 A1 | 2/2004 | Lin et al. |
| 2004/0024963 A1 | 2/2004 | Talagala et al. |
| 2004/0057575 A1 | 3/2004 | Zhang et al. |
| 2004/0062157 A1 | 4/2004 | Kawabe |
| 2004/0073829 A1 | 4/2004 | Olarig |
| 2004/0085849 A1 | 5/2004 | Myoung et al. |
| 2004/0114265 A1 | 6/2004 | Talbert |
| 2004/0143710 A1 | 7/2004 | Walmsley |
| 2004/0148561 A1 | 7/2004 | Shen et al. |
| 2004/0153902 A1 | 8/2004 | Machado et al. |
| 2004/0158775 A1 | 8/2004 | Shibuya et al. |
| 2004/0167898 A1 | 8/2004 | Margolus et al. |
| 2004/0181734 A1 | 9/2004 | Saliba |
| 2004/0199714 A1 | 10/2004 | Estakhri et al. |
| 2004/0210706 A1 | 10/2004 | In et al. |
| 2004/0237018 A1 | 11/2004 | Riley |
| 2005/0060456 A1 | 3/2005 | Shrader et al. |
| 2005/0060501 A1 | 3/2005 | Shrader |
| 2005/0073884 A1 | 4/2005 | Gonzalez et al. |
| 2005/0108588 A1 | 5/2005 | Yuan |
| 2005/0114587 A1 | 5/2005 | Chou et al. |
| 2005/0138442 A1 | 6/2005 | Keller, Jr. et al. |
| 2005/0154825 A1 | 7/2005 | Fair |
| 2005/0172065 A1 | 8/2005 | Keays |
| 2005/0172207 A1 | 8/2005 | Radke et al. |
| 2005/0193161 A1 | 9/2005 | Lee et al. |
| 2005/0201148 A1 | 9/2005 | Chen et al. |
| 2005/0210348 A1 | 9/2005 | Totsuka |
| 2005/0231765 A1 | 10/2005 | So et al. |
| 2005/0249013 A1 | 11/2005 | Janzen et al. |
| 2005/0251617 A1 | 11/2005 | Sinclair et al. |
| 2005/0257120 A1 | 11/2005 | Gorobets et al. |
| 2005/0273560 A1 | 12/2005 | Hulbert et al. |
| 2005/0281088 A1 | 12/2005 | Ishidoshiro et al. |
| 2005/0289314 A1 | 12/2005 | Adusumilli et al. |
| 2006/0010174 A1 | 1/2006 | Nguyen et al. |
| 2006/0039196 A1 | 2/2006 | Gorobets et al. |
| 2006/0039227 A1 | 2/2006 | Lai et al. |
| 2006/0053246 A1 | 3/2006 | Lee |
| 2006/0069932 A1 | 3/2006 | Oshikawa et al. |
| 2006/0085671 A1 | 4/2006 | Majni et al. |
| 2006/0087893 A1* | 4/2006 | Nishihara et al. ........ 365/189.01 |
| 2006/0103480 A1 | 5/2006 | Moon et al. |
| 2006/0107181 A1 | 5/2006 | Dave et al. |
| 2006/0136570 A1 | 6/2006 | Pandya |
| 2006/0136681 A1 | 6/2006 | Jain et al. |
| 2006/0156177 A1 | 7/2006 | Kottapalli et al. |
| 2006/0195650 A1 | 8/2006 | Su et al. |
| 2006/0224841 A1 | 10/2006 | Terai et al. |
| 2006/0244049 A1 | 11/2006 | Yaoi et al. |
| 2006/0259528 A1 | 11/2006 | Dussud et al. |
| 2006/0291301 A1 | 12/2006 | Ziegelmayer |
| 2007/0011413 A1 | 1/2007 | Nonaka et al. |
| 2007/0058446 A1 | 3/2007 | Hwang et al. |
| 2007/0061597 A1 | 3/2007 | Holtzman et al. |
| 2007/0076479 A1 | 4/2007 | Kim et al. |
| 2007/0081408 A1 | 4/2007 | Kwon et al. |
| 2007/0083697 A1 | 4/2007 | Birrell et al. |
| 2007/0088716 A1 | 4/2007 | Brumme et al. |
| 2007/0091677 A1 | 4/2007 | Lasser et al. |
| 2007/0106679 A1 | 5/2007 | Perrin et al. |
| 2007/0113019 A1 | 5/2007 | Beukema et al. |
| 2007/0133312 A1 | 6/2007 | Roohparvar |
| 2007/0147113 A1 | 6/2007 | Mokhlesi et al. |
| 2007/0150790 A1 | 6/2007 | Gross et al. |
| 2007/0156842 A1 | 7/2007 | Vermeulen et al. |
| 2007/0157064 A1 | 7/2007 | Falik et al. |
| 2007/0174579 A1 | 7/2007 | Shin |
| 2007/0180188 A1 | 8/2007 | Fujibayashi et al. |
| 2007/0180346 A1 | 8/2007 | Murin |
| 2007/0191993 A1 | 8/2007 | Wyatt |
| 2007/0201274 A1 | 8/2007 | Yu et al. |
| 2007/0204128 A1 | 8/2007 | Lee et al. |
| 2007/0208901 A1 | 9/2007 | Purcell et al. |
| 2007/0234143 A1 | 10/2007 | Kim |
| 2007/0245061 A1 | 10/2007 | Harriman |
| 2007/0245099 A1 | 10/2007 | Gray et al. |
| 2007/0263442 A1 | 11/2007 | Cornwell et al. |
| 2007/0277036 A1 | 11/2007 | Chamberlain et al. |
| 2007/0279988 A1 | 12/2007 | Nguyen |
| 2007/0291556 A1 | 12/2007 | Kamei |
| 2007/0294496 A1 | 12/2007 | Goss et al. |
| 2007/0300130 A1 | 12/2007 | Gorobets |
| 2008/0019182 A1 | 1/2008 | Yanagidaira et al. |
| 2008/0022163 A1 | 1/2008 | Tanaka et al. |
| 2008/0028275 A1 | 1/2008 | Chen et al. |
| 2008/0043871 A1 | 2/2008 | Latouche et al. |
| 2008/0052446 A1 | 2/2008 | Lasser et al. |
| 2008/0052451 A1 | 2/2008 | Pua et al. |
| 2008/0056005 A1 | 3/2008 | Aritome |
| 2008/0059602 A1 | 3/2008 | Matsuda et al. |
| 2008/0071971 A1 | 3/2008 | Kim et al. |
| 2008/0077841 A1 | 3/2008 | Gonzalez et al. |
| 2008/0077937 A1 | 3/2008 | Shin et al. |
| 2008/0086677 A1 | 4/2008 | Yang et al. |
| 2008/0112226 A1 | 5/2008 | Mokhlesi |
| 2008/0141043 A1 | 6/2008 | Flynn et al. |
| 2008/0144371 A1 | 6/2008 | Yeh et al. |
| 2008/0147714 A1 | 6/2008 | Breternitz et al. |
| 2008/0147964 A1 | 6/2008 | Chow et al. |
| 2008/0147998 A1 | 6/2008 | Jeong |
| 2008/0148124 A1 | 6/2008 | Zhang et al. |
| 2008/0163030 A1 | 7/2008 | Lee |
| 2008/0168191 A1 | 7/2008 | Biran et al. |
| 2008/0168319 A1 | 7/2008 | Lee et al. |
| 2008/0170460 A1 | 7/2008 | Oh et al. |
| 2008/0209282 A1 | 8/2008 | Lee et al. |
| 2008/0229000 A1 | 9/2008 | Kim |
| 2008/0229003 A1 | 9/2008 | Mizushima et al. |
| 2008/0229176 A1 | 9/2008 | Arnez et al. |
| 2008/0270680 A1 | 10/2008 | Chang |
| 2008/0282128 A1 | 11/2008 | Lee et al. |
| 2008/0285351 A1 | 11/2008 | Shlick et al. |
| 2008/0313132 A1 | 12/2008 | Hao et al. |
| 2009/0003046 A1 | 1/2009 | Nirschl et al. |
| 2009/0003058 A1 | 1/2009 | Kang |
| 2009/0019216 A1* | 1/2009 | Yamada et al. ............... 711/103 |
| 2009/0031083 A1 | 1/2009 | Willis et al. |
| 2009/0037652 A1 | 2/2009 | Yu et al. |
| 2009/0070608 A1 | 3/2009 | Kobayashi |
| 2009/0116283 A1 | 5/2009 | Ha et al. |
| 2009/0125671 A1 | 5/2009 | Flynn et al. |
| 2009/0144598 A1 | 6/2009 | Yoon et al. |
| 2009/0168525 A1 | 7/2009 | Olbrich et al. |
| 2009/0172258 A1 | 7/2009 | Olbrich et al. |
| 2009/0172259 A1 | 7/2009 | Prins et al. |
| 2009/0172260 A1 | 7/2009 | Olbrich et al. |
| 2009/0172261 A1 | 7/2009 | Prins et al. |
| 2009/0172262 A1 | 7/2009 | Olbrich et al. |
| 2009/0172308 A1 | 7/2009 | Prins et al. |
| 2009/0172335 A1 | 7/2009 | Kulkarni et al. |
| 2009/0172499 A1 | 7/2009 | Olbrich et al. |
| 2009/0193058 A1 | 7/2009 | Reid |
| 2009/0204823 A1 | 8/2009 | Giordano et al. |
| 2009/0207660 A1 | 8/2009 | Hwang et al. |
| 2009/0213649 A1* | 8/2009 | Takahashi ............ G06Q 20/341 365/184 |
| 2009/0222708 A1 | 9/2009 | Yamaga |
| 2009/0228761 A1 | 9/2009 | Perlmutter et al. |
| 2009/0249160 A1 | 10/2009 | Gao et al. |
| 2009/0268521 A1 | 10/2009 | Ueno et al. |
| 2009/0292972 A1 | 11/2009 | Seol et al. |
| 2009/0296466 A1 | 12/2009 | Kim et al. |
| 2009/0296486 A1 | 12/2009 | Kim et al. |
| 2009/0310422 A1 | 12/2009 | Edahiro et al. |
| 2009/0319864 A1 | 12/2009 | Shrader |
| 2010/0002506 A1 | 1/2010 | Cho et al. |
| 2010/0008175 A1 | 1/2010 | Sweere et al. |
| 2010/0011261 A1 | 1/2010 | Cagno et al. |
| 2010/0020620 A1 | 1/2010 | Kim et al. |
| 2010/0037012 A1* | 2/2010 | Yano et al. ................... 711/103 |
| 2010/0061151 A1 | 3/2010 | Miwa et al. |
| 2010/0091535 A1 | 4/2010 | Sommer et al. |

(56) References Cited

U.S. PATENT DOCUMENTS

| | | |
|---|---|---|
| 2010/0103737 A1 | 4/2010 | Park |
| 2010/0110798 A1 | 5/2010 | Hoei et al. |
| 2010/0115206 A1 | 5/2010 | de la Iglesia et al. |
| 2010/0118608 A1 | 5/2010 | Song et al. |
| 2010/0138592 A1 | 6/2010 | Cheon |
| 2010/0153616 A1 | 6/2010 | Garratt |
| 2010/0161936 A1 | 6/2010 | Royer et al. |
| 2010/0174959 A1 | 7/2010 | No et al. |
| 2010/0185807 A1 | 7/2010 | Meng et al. |
| 2010/0199027 A1 | 8/2010 | Pucheral et al. |
| 2010/0199125 A1 | 8/2010 | Reche |
| 2010/0199138 A1 | 8/2010 | Rho |
| 2010/0202196 A1 | 8/2010 | Lee et al. |
| 2010/0202239 A1 | 8/2010 | Moshayedi et al. |
| 2010/0208521 A1 | 8/2010 | Kim et al. |
| 2010/0257379 A1 | 10/2010 | Wang et al. |
| 2010/0262889 A1 | 10/2010 | Bains |
| 2010/0281207 A1 | 11/2010 | Miller et al. |
| 2010/0281342 A1 | 11/2010 | Chang et al. |
| 2010/0306222 A1 | 12/2010 | Freedman et al. |
| 2010/0332858 A1 | 12/2010 | Trantham et al. |
| 2010/0332863 A1 | 12/2010 | Johnston |
| 2011/0010514 A1 | 1/2011 | Benhase et al. |
| 2011/0022779 A1 | 1/2011 | Lund et al. |
| 2011/0022819 A1 | 1/2011 | Post et al. |
| 2011/0051513 A1 | 3/2011 | Shen et al. |
| 2011/0066597 A1 | 3/2011 | Mashtizadeh et al. |
| 2011/0066806 A1 | 3/2011 | Chhugani et al. |
| 2011/0072302 A1 | 3/2011 | Sartore |
| 2011/0078407 A1 | 3/2011 | Lewis |
| 2011/0083060 A1 | 4/2011 | Sakurada et al. |
| 2011/0099460 A1 | 4/2011 | Dusija et al. |
| 2011/0113281 A1 | 5/2011 | Zhang et al. |
| 2011/0122691 A1 | 5/2011 | Sprouse |
| 2011/0131444 A1 | 6/2011 | Buch et al. |
| 2011/0138260 A1 | 6/2011 | Savin |
| 2011/0173378 A1 | 7/2011 | Filor et al. |
| 2011/0179249 A1 | 7/2011 | Hsiao |
| 2011/0199825 A1 | 8/2011 | Han et al. |
| 2011/0205823 A1 | 8/2011 | Hemink et al. |
| 2011/0213920 A1 | 9/2011 | Frost et al. |
| 2011/0222342 A1 | 9/2011 | Yoon et al. |
| 2011/0225346 A1 | 9/2011 | Goss et al. |
| 2011/0228601 A1 | 9/2011 | Olbrich et al. |
| 2011/0231600 A1 | 9/2011 | Tanaka et al. |
| 2011/0239077 A1 | 9/2011 | Bai et al. |
| 2011/0264843 A1 | 10/2011 | Haines et al. |
| 2011/0271040 A1 | 11/2011 | Kamizono |
| 2011/0283119 A1 | 11/2011 | Szu et al. |
| 2011/0289125 A1 | 11/2011 | Guthery |
| 2012/0011393 A1 | 1/2012 | Roberts et al. |
| 2012/0017053 A1 | 1/2012 | Yang et al. |
| 2012/0023144 A1 | 1/2012 | Rub |
| 2012/0054414 A1 | 3/2012 | Tsai et al. |
| 2012/0063234 A1 | 3/2012 | Shiga et al. |
| 2012/0072639 A1 | 3/2012 | Goss et al. |
| 2012/0096217 A1 | 4/2012 | Son et al. |
| 2012/0110250 A1 | 5/2012 | Sabbag et al. |
| 2012/0117317 A1 | 5/2012 | Sheffler |
| 2012/0117397 A1 | 5/2012 | Kolvick et al. |
| 2012/0124273 A1 | 5/2012 | Goss et al. |
| 2012/0131286 A1 | 5/2012 | Faith et al. |
| 2012/0151124 A1 | 6/2012 | Baek et al. |
| 2012/0151253 A1 | 6/2012 | Horn |
| 2012/0151294 A1 | 6/2012 | Yoo et al. |
| 2012/0173797 A1 | 7/2012 | Shen |
| 2012/0173826 A1 | 7/2012 | Takaku |
| 2012/0185750 A1 | 7/2012 | Hayami |
| 2012/0195126 A1 | 8/2012 | Roohparvar |
| 2012/0203951 A1 | 8/2012 | Wood et al. |
| 2012/0210095 A1 | 8/2012 | Nellans et al. |
| 2012/0216079 A1 | 8/2012 | Fai et al. |
| 2012/0233391 A1 | 9/2012 | Frost et al. |
| 2012/0236658 A1 | 9/2012 | Byom et al. |
| 2012/0239858 A1 | 9/2012 | Melik-Martirosian |
| 2012/0239868 A1 | 9/2012 | Ryan et al. |
| 2012/0239976 A1 | 9/2012 | Cometti et al. |
| 2012/0259863 A1 | 10/2012 | Bodwin et al. |
| 2012/0275466 A1 | 11/2012 | Bhadra et al. |
| 2012/0278564 A1 | 11/2012 | Goss et al. |
| 2012/0284574 A1 | 11/2012 | Avila et al. |
| 2012/0284587 A1 | 11/2012 | Yu et al. |
| 2013/0007073 A1 | 1/2013 | Varma |
| 2013/0007343 A1 | 1/2013 | Rub et al. |
| 2013/0007543 A1 | 1/2013 | Goss et al. |
| 2013/0024735 A1 | 1/2013 | Chung et al. |
| 2013/0031438 A1 | 1/2013 | Hu et al. |
| 2013/0036418 A1 | 2/2013 | Yadappanavar et al. |
| 2013/0038380 A1 | 2/2013 | Cordero et al. |
| 2013/0047045 A1 | 2/2013 | Hu et al. |
| 2013/0073798 A1 | 3/2013 | Kang et al. |
| 2013/0073924 A1 | 3/2013 | D'Abreu et al. |
| 2013/0079942 A1 | 3/2013 | Smola et al. |
| 2013/0086131 A1 | 4/2013 | Hunt et al. |
| 2013/0086132 A1 | 4/2013 | Hunt et al. |
| 2013/0094288 A1 | 4/2013 | Patapoutian et al. |
| 2013/0111279 A1 | 5/2013 | Jeon et al. |
| 2013/0111298 A1 | 5/2013 | Seroff et al. |
| 2013/0117606 A1 | 5/2013 | Anholt et al. |
| 2013/0121084 A1 | 5/2013 | Jeon et al. |
| 2013/0124792 A1 | 5/2013 | Melik-Martirosian et al. |
| 2013/0124888 A1 | 5/2013 | Tanaka et al. |
| 2013/0128666 A1 | 5/2013 | Avila et al. |
| 2013/0132652 A1 | 5/2013 | Wood et al. |
| 2013/0176784 A1 | 7/2013 | Cometti et al. |
| 2013/0179646 A1* | 7/2013 | Okubo et al. ............ 711/154 |
| 2013/0191601 A1 | 7/2013 | Peterson et al. |
| 2013/0194865 A1 | 8/2013 | Bandic et al. |
| 2013/0194874 A1 | 8/2013 | Mu et al. |
| 2013/0232289 A1 | 9/2013 | Zhong et al. |
| 2013/0238576 A1 | 9/2013 | Binkert et al. |
| 2013/0254498 A1 | 9/2013 | Adachi et al. |
| 2013/0254507 A1 | 9/2013 | Islam et al. |
| 2013/0258738 A1 | 10/2013 | Barkon et al. |
| 2013/0265838 A1 | 10/2013 | Li |
| 2013/0282955 A1 | 10/2013 | Parker et al. |
| 2013/0290611 A1 | 10/2013 | Biederman et al. |
| 2013/0297613 A1 | 11/2013 | Yu |
| 2013/0301373 A1 | 11/2013 | Tam |
| 2013/0304980 A1 | 11/2013 | Nachimuthu et al. |
| 2013/0343131 A1 | 12/2013 | Wu et al. |
| 2014/0013027 A1 | 1/2014 | Jannyavula Venkata et al. |
| 2014/0013188 A1 | 1/2014 | Wu et al. |
| 2014/0025864 A1 | 1/2014 | Zhang et al. |
| 2014/0032890 A1 | 1/2014 | Lee et al. |
| 2014/0063905 A1 | 3/2014 | Ahn et al. |
| 2014/0067761 A1 | 3/2014 | Chakrabarti et al. |
| 2014/0075133 A1 | 3/2014 | Li et al. |
| 2014/0082261 A1 | 3/2014 | Cohen et al. |
| 2014/0082310 A1 | 3/2014 | Nakajima |
| 2014/0082456 A1 | 3/2014 | Liu |
| 2014/0095775 A1 | 4/2014 | Talagala et al. |
| 2014/0101389 A1 | 4/2014 | Nellans et al. |
| 2014/0115238 A1 | 4/2014 | Xi et al. |
| 2014/0122818 A1 | 5/2014 | Hayasaka et al. |
| 2014/0122907 A1 | 5/2014 | Johnston |
| 2014/0136883 A1 | 5/2014 | Cohen |
| 2014/0136927 A1 | 5/2014 | Li et al. |
| 2014/0143505 A1 | 5/2014 | Sim et al. |
| 2014/0157065 A1 | 6/2014 | Ong |
| 2014/0181458 A1 | 6/2014 | Loh et al. |
| 2014/0201596 A1 | 7/2014 | Baum et al. |
| 2014/0223084 A1 | 8/2014 | Lee et al. |
| 2014/0244578 A1 | 8/2014 | Winkelstraeter |
| 2014/0258755 A1 | 9/2014 | Stenfort |
| 2014/0269090 A1 | 9/2014 | Flynn et al. |
| 2014/0310494 A1 | 10/2014 | Higgins et al. |
| 2014/0359381 A1 | 12/2014 | Takeuchi et al. |
| 2015/0023097 A1 | 1/2015 | Khoueir et al. |
| 2015/0037624 A1 | 2/2015 | Thompson et al. |
| 2015/0153799 A1 | 6/2015 | Lucas et al. |
| 2015/0153802 A1 | 6/2015 | Lucas et al. |
| 2015/0212943 A1 | 7/2015 | Yang et al. |
| 2015/0268879 A1 | 9/2015 | Chu |

(56) References Cited

U.S. PATENT DOCUMENTS

FOREIGN PATENT DOCUMENTS

| EP | 1 990 921 A2 | 11/2008 |
|---|---|---|
| EP | 2 386 958 A1 | 11/2011 |
| EP | 2 620 946 A2 | 7/2013 |
| JP | 2002-532806 S | 10/2002 |
| WO | WO 2007/036834 A2 | 4/2007 |
| WO | WO 2007/080586 A2 | 7/2007 |
| WO | WO 2008/075292 A2 | 8/2008 |
| WO | WO 2008/121553 | 10/2008 |
| WO | WO 2008/121577 | 10/2008 |
| WO | WO 2009/028281 A1 | 3/2009 |
| WO | WO 2009/032945 A1 | 3/2009 |
| WO | WO 2009/058140 A1 | 5/2009 |
| WO | WO 2009/084724 | 7/2009 |
| WO | WO 2009/134576 A1 | 11/2009 |
| WO | WO 2011/024015 | 3/2011 |

OTHER PUBLICATIONS

International Search Report and Written Opinion dated Mar. 7, 2014, received in International Patent Application No. PCT/US2013/074772, which corresponds to U.S. Appl. No. 13/831,218, 10 pages (George).

International Search Report and Written Opinion dated Mar. 24, 2014, received in International Patent Application No. PCT/US2013/074777, which corresponds to U.S. Appl. No. 13/831,308, 10 pages (George).

International Search Report and Written Opinion dated Mar. 7, 2014, received in International Patent Application No. PCT/US2013/074779, which corresponds to U.S. Appl. No. 13/831,374, 8 pages (George).

Canim, Buffered Bloom ilters on Solid State Storage, ADMS*10, Singapore, Sep. 13-17, 2010, 8 pgs.

Lu, A Forest-structured Bloom Filter with Flash Memory, MSST 2011, Denver, CO, May 23-27, 2011, article, 6 pgs.

Lu, A Forest-structured Bloom Filter with Flash Memory, MSST 2011, Denver, CO, May 23-27, 2011, presentation slides, 25 pgs.

SanDisk Enterprise IP LLC, International Search Report / Written Opinion, PCT/US2012/059447, Jun. 6, 2013, 12 pgs.

SanDisk Enterprise IP LLC, International Search Report / Written Opinion, PCT/US2012/059453, Jun. 6, 2013, 12 pgs.

SanDisk Enterprise IP LLC, International Search Report / Written Opinion, PCT/US2012/065914, May 23, 2013, 7 pgs.

SanDisk Enterprise IP LLC, International Search Report / Written Opinion, PCT/US2012/065919, Jun. 17, 2013, 8 pgs.

SanDisk Enterprise IP LLC, Notification of the Decision to Grant a Patent Right for Patent for Invention, CN 200880127623.8, Jul. 4, 2013, 1 pg.

Barr, Introduction to Watchdog Timers, Oct. 2001, 3 pgs.

Kang, A Multi-Channel Architecture for High-Performance NAND Flash-Based Storage System, J. Syst. Archit., 53, 9, Sep. 2007, 15 pgs.

Kim, A Space-Efficient Flash Translation Layer for CompactFlash Systems, May 2002, 10 pgs.

McLean, Information Technology-AT Attachment with Packet Interface Extension, Aug. 19, 1998, 339 pgs.

Park, A High Performance Controller for NAND Flash-Based Solid State Disk (NSSD), Feb. 12-16, 2006, 4 pgs.

Pliant Technology, International Search Report / Written Opinion, PCT/US08/88133, Mar. 19, 2009, 7 pgs.

Pliant Technology, International Search Report / Written Opinion, PCT/US08/88136, Mar. 19, 2009, 7 pgs.

Pliant Technology, International Search Report / Written Opinion, PCT/US08/88146, Feb. 26, 2009, 10 pgs.

Pliant Technology, International Search Report / Written Opinion, PCT/US08/88154, Feb. 27, 2009, 9 pgs.

Pliant Technology, Written Opinion, PCT/US08/88164, Feb. 13, 2009, 6 pgs.

Pliant Technology, International Search Report / Written Opinion, PCT/US08/88206, Feb. 18, 2009, 8 pgs.

Pliant Technology, International Search Report / Written Opinion, PCT/US08/88217, Feb. 19, 2009, 7 pgs.

Pliant Technology, International Search Report / Written Opinion, PCT/US08/88229, Feb. 13, 2009, 8 pgs.

Pliant Technology, International Search Report / Written Opinion, PCT/US08/88232, Feb. 19, 2009, 8 pgs.

Pliant Technology, International Search Report / Written Opinion, PCT/US08/88236, Feb. 19, 2009, 7 pgs.

Pliant Technology, International Search Report / Written Opinion, PCT/US2011/028637, Oct. 27, 2011, 11 pgs.

Pliant Technology, Supplementary ESR, 08866997.3, Feb. 23, 2012, 6 pgs.

SanDisk Enterprise IP LLC, International Search Report / Written Opinion, PCT/US2012/042771, Mar. 4, 2013, 14 pgs.

SanDisk Enterprise IP LLC, International Search Report / Written Opinion, PCT/US2012/065916, Apr. 5, 2013, 7 pgs.

SanDisk Enterprise IP LLC, International Search Report / Written Opinion, PCT/US2012/042764, Aug. 31, 2012, 12 pgs.

SanDisk Enterprise IP LLC, International Search Report / Written Opinion, PCT/US2012/042775, Sep. 26, 2012, 9 pgs.

SanDisk Enterprise IP LLC, International Search Report / Written Opinion, PCT/US2012/059459, Feb. 14, 2013, 9 pgs.

SanDisk Enterprise IP LLC, Office Action, CN 200880127623.8, Apr. 18, 2012, 12 pgs.

SanDisk Enterprise IP LLC, Office Action, CN 200880127623.8, Dec. 31, 2012, 9 pgs.

SanDisk Enterprise IP LLC, Office Action, JP 2010-540863, Jul. 24, 2012, 3 pgs.

Watchdog Timer and Power Savin Modes, Microchip Technology Inc., 2005.

Zeidman, 1999 Verilog Designer's Library (04US), 9 pgs.

Invitation to Pay Additional Fees dated Feb. 13, 2015, received in International Patent Application No. PCT/US2014/063949, which corresponds to U.S. Appl. No. 14/135,433, 6 pages (Delpapa).

International Search Report and Written Opinion dated Mar. 9, 2015, received in International Patent Application No. PCT/US2014/059747, which corresponds to U.S. Appl. No. 14/137,440, 9 pages (Fitzpatrick).

International Search Report and Written Opinion dated Jan. 21, 2015, received in International Application No. PCT/US2014/059748, which corresponds to U.S. Appl. No. 14/137,511, 13 pages (Dancho).

International Search Report and Written Opinion dated Feb. 18, 2015, received in International Application No. PCT/US2014/066921, which corresponds to U.S. Appl. No. 14/135,260, 13 pages (Fitzpatrick).

Ashkenazi et al., "Platform independent overall security architecture in multi-processor system-on-chip integrated circuits for use in mobile phones and handheld devices," ScienceDirect, Computers and Electrical Engineering 33 (2007), 18 pages.

Lee et al., "A Semi-Preemptive Garbage Collector for Solid State Drives," Apr. 2011, IEEE, pp. 12-21.

Office Action dated Feb. 17, 2015, received in Chinese Patent Application No. 201210334987.1, which corresponds to U.S. Appl. No. 12/082,207, 9 pages (Prins).

International Search Report and Written Opinion dated May 4, 2015, received in International Patent Application No. PCT/US2014/065987, which corresponds to U.S. Appl. No. 14/135,400, 12 pages (George).

International Search Report and Written Opinion dated Mar. 17, 2015, received in International Patent Application No. PCT/US2014/067467, which corresponds to U.S. Appl. No. 14/135,420, 13 pages (Lucas).

International Search Report and Written Opinion dated Apr. 20, 2015, received in International Patent Application No. PCT/US2014/063949, which corresponds to U.S. Appl. No. 14/135,433, 21 pages (Delpapa).

Bayer, "Prefix B-Trees", ip.com Journal, IP.COM Inc., West Henrietta, NY, Mar. 30, 2007, 29 pages.

(56) References Cited

OTHER PUBLICATIONS

Bhattacharjee et al., "Efficient Index Compression in DB2 LUW", IBM Research Report, Jun. 23, 2009, http://domino.research.ibm.com/library/cyberdig.nsf/papers/40B2C45876D0D747852575E100620CE7/$File/rc24815.pdf, 13 pages.

Oracle, "Oracle9i: Database Concepts", Jul. 2001, http://docs.oracle.com/cd/A91202_01/901_doc/server.901/a88856.pdf, 49 pages.

Office Action dated Dec. 8, 2014, received in Chinese Patent Application No. 201180021660.2, which corresponds to U.S. Appl. No. 12/726,200, 7 pages (Olbrich).

Office Action dated Jul. 31, 2015, received in Chinese Patent Application No. 201180021660.2, which corresponds to U.S. Appl. No. 12/726,200, 9 pages (Olbrich).

International Search Report and Written Opinion dated Jun. 8, 2015, received in International Patent Application No. PCT/US2015/018252, which corresponds to U.S. Appl. No. 14/339,072, 9 pages (Busch).

International Search Report and Written Opinion dated Jun. 2, 2015, received in International Patent Application No. PCT/US2015/018255, which corresponds to U.S. Appl. No. 14/336,967, 14 pages (Chander).

International Search Report and Written Opinion dated Jun. 30, 2015, received in International Patent Application No. PCT/US2015/023927, which corresponds to U.S. Appl. No. 14/454,687, 11 pages (Kadayam).

International Search Report and Written Opinion dated Jul. 23, 2015, received in International Patent Application No. PCT/US2015/030850, which corresponds to U.S. Appl. No. 14/298,843, 12 pages (Ellis).

IBM Research-Zurich, "The Fundamental Limit of Flash Random Write Performance: Understanding, Analysis and Performance Modeling," Mar. 31, 2010, pp. 1-15.

International Search Report and Written Opinion dated Sep. 14, 2015, received in International Patent Application No. PCT/US2015/036807, which corresponds to U.S. Appl. No. 14/311,152, 9 pages (Higgins).

Gasior, "Gigabyte's i-Ram storage device, Ram disk without the fuss," The Tech Report, p. 1, Jan. 25, 2006, 5 pages.

Oestreicher et al., "Object Lifetimes in Java Card," 1999, USENIX, 10 pages.

\* cited by examiner

PERSISTENT STORAGE DEVICE WITH NVRAM FOR STAGING WRITES

RELATED APPLICATIONS

This application claims priority to U.S. Provisional Patent Application No. 61/746,079, filed Dec. 26, 2012, which is hereby incorporated by reference in its entirety.

TECHNICAL FIELD

The disclosed embodiments relate generally to persistent storage devices.

BACKGROUND

It is well known that flash memory devices, and at least some other types of semiconductor-based persistent storage devices, have limited endurance. For example, various implementations of flash memory cells have practical limits on the number of block erase cycles that can be performed before the reliability of those flash memory cells falls below an acceptable level (e.g., an associated bit error rate rises above the level that can be corrected using the error correction information stored with the data).

The embodiments described herein provide mechanisms and methods for reducing writes to persistent storage and thereby increase the practical useful life of such devices.

SUMMARY

In the present disclosure, a persistent storage device includes both persistent storage, which includes a set of persistent storage blocks, and NVRAM, and in particular a set of NVRAM blocks. The persistent storage device also typically includes a storage controller. The persistent storage device, in addition to responding to commands to write data directly to and to read data directly from persistent storage blocks, is also configured to write data to specified NVRAM blocks (e.g., specified by a host NVRAM write command) and to transfer data from a specified NVRAM block to a specified persistent storage block. As a result, multiple writes to a particular persistent storage block can be replaced with multiple writes to an NVRAM block and a subsequent single write to the particular persistent storage block. This reduces the number of writes to persistent storage and also reduces the number of corresponding block erase operations. Furthermore, performance of the persistent storage device is improved in that writes to NVRAM are faster and expend less energy than writes of the same amount of data to flash memory.

BRIEF DESCRIPTION OF THE DRAWINGS

Like reference numerals refer to corresponding parts throughout the drawings.

DESCRIPTION OF EMBODIMENTS

In some implementations, a host device writes data to a persistent storage device multiple times, using a sequence of write operations, with some of the data being written during that sequence of write operations repeatedly to a single persistent storage block or a small number of storage blocks. For example, an application may write a sequence of log records to persistent storage. In this example, each of the log records is much smaller than the smallest unit of erasable data storage in the persistent storage device (herein called a persistent storage block) and the log records are stored to sequential logical addresses associated with the persistent storage device. As a result, writing the sequence of log records directly to persistent storage results in multiple writes to the same persistent storage block. Each such write actually requires multiple internal operations, including remapping the logical address to an available persistent storage block, storing data to the newly assigned persistent storage block, and erasing the previously used persistent storage block. If, instead, all the log records to be stored to any one persistent storage block were written to that persistent storage block all at once, the amount of "wear" on the persistent storage device would be reduced.

In the present disclosure, a persistent storage device includes persistent storage, which includes a set of persistent storage blocks, and NVRAM, which includes a set of NVRAM blocks. The persistent storage device also includes a storage controller configured to receive commands from an external host device and further configured to: in response to a host NVRAM write command, store data to a specified NVRAM block; in response to a transfer command, transfer data in the specified NVRAM block to a corresponding persistent storage block; in response to a host persistent storage write command, store data to a specified persistent storage block; and in response to a host persistent storage read command, retrieve data from the specified persistent storage block.

In some embodiments, the persistent storage device is implemented as a single, monolithic integrated circuit. In some embodiments, the persistent storage includes flash memory, and the NVRAM includes non-volatile storage selected from the set consisting of EPROM, EEPROM, battery backed SRAM, battery backed DRAM, supercapacitor backed DRAM, ferroelectric RAM, magnetoresistive RAM, and phase-change RAM. In some embodiments, the persistent storage device further includes a host interface for interfacing the persistent storage device to a memory controller of the external host device. Optionally, the storage controller is further configured to respond to a host NVRAM read command by retrieving data from the specified NVRAM block. In some embodiments, a logical block address is associated with the specified NVRAM block, and the corresponding persistent storage block corresponds to the logical block address.

In some embodiments, the storage controller is further configured to respond to a respective host command by storing a logical block address, specified by the host command, in association with the specified NVRAM block. In some embodiments, a predefined portion of the NVRAM stores one or more logical block addresses, each associated with a respective NVRAM block. In some embodiments, a logical block address is associated with the specified NVRAM block, and the corresponding persistent storage block is identified by the storage controller using a logical block address to physical address mapping. In some embodiments, the transfer command includes a first predefined transfer command, and the storage controller is further configured to respond to a second predefined transfer command by storing data in a persistent storage block specified by the second predefined transfer command to a NVRAM block specified by the second predefined transfer command.

In another aspect of the present disclosure, a method for managing a persistent storage device is provided. In some embodiments, the method is performed at the persistent storage device, which includes persistent storage and NVRAM. The persistent storage includes a set of persistent storage blocks and the NVRAM includes a set of NVRAM blocks. The method includes receiving commands from an external host device; in response to a host NVRAM write command, storing data to a specified NVRAM block; in response to a transfer command, storing data in a NVRAM block specified by the transfer command to a corresponding persistent storage block; in response to a host persistent storage write command, storing data to a specified persistent storage block; and in response to a host persistent storage read command, retrieving data from the specified persistent storage block.

In some embodiments, the method further includes, at the persistent storage device, automatically transferring data from NVRAM to persistent storage upon occurrence of a predefined trigger condition selected from the set consisting of the amount of data stored to the specified NVRAM block reaching a predefined threshold and data being stored to a predefined portion of the specified NVRAM block. In some embodiments, the method further includes, under control of the external host device: after loss of power, reading from NVRAM a set of logical block addresses, including the logical block address, if any, associated with each NVRAM block in the set of NVRAM blocks; and copying data from each NVRAM block having an associated logical block address to a persistent storage block corresponding to the associated logical block address.

In yet another aspect of the present disclosure, a method for storing data to a persistent storage device is performed at a host device external to the persistent storage device. The method includes issuing a plurality of NVRAM write commands to store data in a specified block of NVRAM in the persistent storage device. The persistent storage device includes persistent storage and NVRAM, the persistent storage including a set of persistent storage blocks and the NVRAM including a set of NVRAM blocks that includes the specified block of NVRAM. The method further includes issuing a predefined transfer command, instructing the persistent storage device to store data in the specified NVRAM block to a corresponding persistent storage block; and issuing a read command, instructing the persistent storage device to retrieve data from the persistent storage block corresponding the specified NVRAM block, and to convey to the host device the data retrieved from the persistent storage block corresponding the specified NVRAM block.

Reference will now be made in detail to various embodiments, examples of which are illustrated in the accompanying drawings. In the following detailed description, numerous specific details are set forth in order to provide a thorough understanding of the disclosed embodiments. However, the disclosed embodiments are optionally practiced without these specific details. In other instances, well-known methods, procedures, components, and circuits have not been described in detail so as not to unnecessarily obscure aspects of the embodiments.

Figure 1:
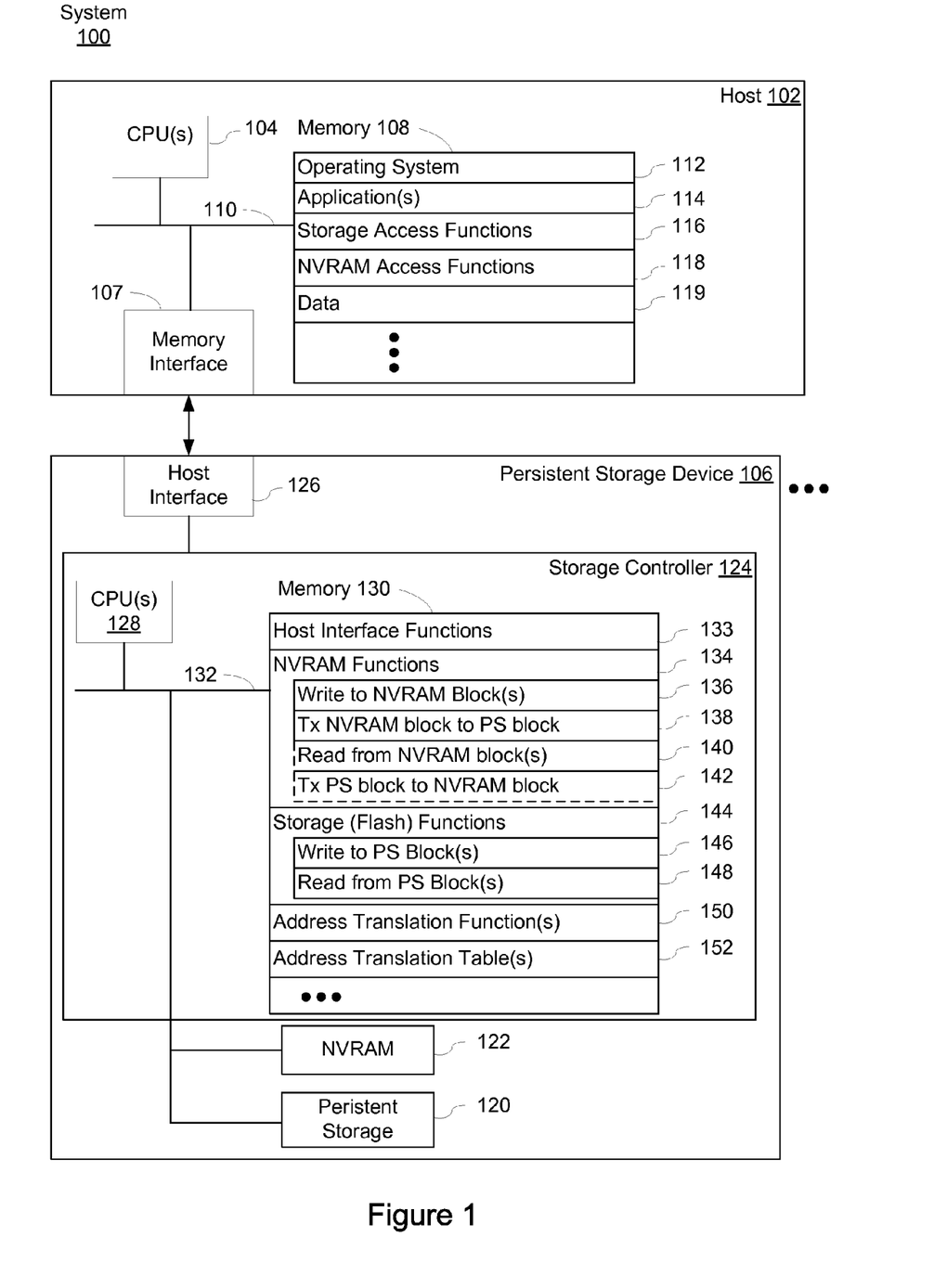
FIG. 1 is a block diagram illustrating a system that includes a persistent storage device and an external host device, in accordance with some embodiments.

FIG. 1 is a block diagram illustrating a system 100 that includes a persistent storage device 106 and an external host device 102 (sometimes herein called host 102), in accordance with some embodiments. For convenience, host 102 is herein described as implemented as a single server or other single computer. Host 102 includes one or more processing units (CPU's) 104, one or more memory interfaces 107, memory 108, and one or more communication buses 110 for interconnecting these components. The communication buses 110 optionally include circuitry (sometimes called a chipset) that interconnects and controls communications between system components. Memory 108 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Further, memory 108 optionally includes one or more storage devices remotely located from the CPU(s) 104. Memory 108, or alternately the non-volatile memory device(s) within memory 108, includes a non-volatile computer readable storage medium. In some embodiments, memory 108 or the non-volatile computer readable storage medium of memory 108 stores the following programs, modules and data structures, or a subset thereof:

- an operating system 112 that includes procedures for handling various basic system services and for performing hardware dependent tasks;
- one or more applications 114 which are configured to (or include instructions to) submit read and write commands to persistent storage device 106 using storage access functions 116 and NVRAM access functions 118;
- storage access functions 116 for reading and writing to persistent storage 120 of persistent storage device 106;
- NVRAM access functions 118 for reading and writing to NVRAM 122 of persistent storage device 106, as well as for transferring data from NVRAM 122 to persistent storage 120; and
- data 119, for example data used by or associated with one of the applications 114; data 119 optionally includes write data, to be written to NVRAM 122 or persistent storage 120 in persistent storage device 106, and/or read data that has been retrieved from NVRAM 122 or persistent storage 120 in persistent storage device 106.

Each of the aforementioned host functions, such as NVRAM access functions 118 and storage access functions 116, is configured for execution by the one or more processors (CPUs) 104 of host 102, so as to perform the associated storage access task or function with respect to NVRAM 122 and/or persistent storage 120 in persistent storage device 106.

In some embodiments, host 102 is connected to persistent storage device 106 via a memory interface 107 of the host 102 and a host interface 126 of the persistent storage device. Host 102 is connected to persistent storage device 106 either directly or through a communication network (not shown) such as the Internet, other wide area networks, local area networks, metropolitan area networks, wireless networks, or any combination of such networks. Optionally, in some implementations, host 102 is connected to a plurality of persistent storage devices 106, only one of which is shown in FIG. 1.

In some embodiments, persistent storage device 106 includes persistent storage 120, NVRAM 122, one or more host interfaces 126, and storage controller 124. Storage controller 124 includes one or more processing units (CPU's) 128, memory 130, and one or more communication buses 132 for interconnecting these components. In some embodiments, communication buses 132 include circuitry (sometimes called a chipset) that interconnects and controls communications between system components. Memory 130 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 130 optionally includes one or more storage devices remotely located from the CPU(s) 128. Memory 130, or alternately the non-volatile memory device(s) within memory 130, includes a non-volatile computer readable storage medium. In some embodiments, memory 130 stores the following programs, modules and data structures, or a subset thereof:

- host interface functions 133 that includes procedures for handling commands sent from host 102 and received by persistent storage device 106 via its host interface 126;
- NVRAM functions 134 for handling NVRAM access function calls issued by host 102; the NVRAM functions 134 include a function 136 to write data to one or more specified NVRAM blocks, a function 138 to transfer data from an NVRAM block to a persistent storage block, and optionally include a function 140 to read data from an NVRAM block, and a function 142 to transfer data from a specified persistent storage block to an NVRAM block;
- storage (flash) functions 144 for handling persistent storage access function calls issued by host 102; the storage functions 144 include a function 146 to write data to one or more specified persistent storage blocks and a function 148 to read data from one more specified persistent storage blocks;
- one or more address translation functions 150 for translating logical block addresses to physical addresses; and
- one or more address translation tables 152 for storing logical to physical address mapping information.

Each of the aforementioned storage controller functions, such as NVRAM functions 134 and storage functions 144, is configured for execution by the one or more processors (CPUs) 128 of storage controller 124, so as to perform the associated task or function with respect to NVRAM 122, persistent storage 120, or both.

Figure 2A:
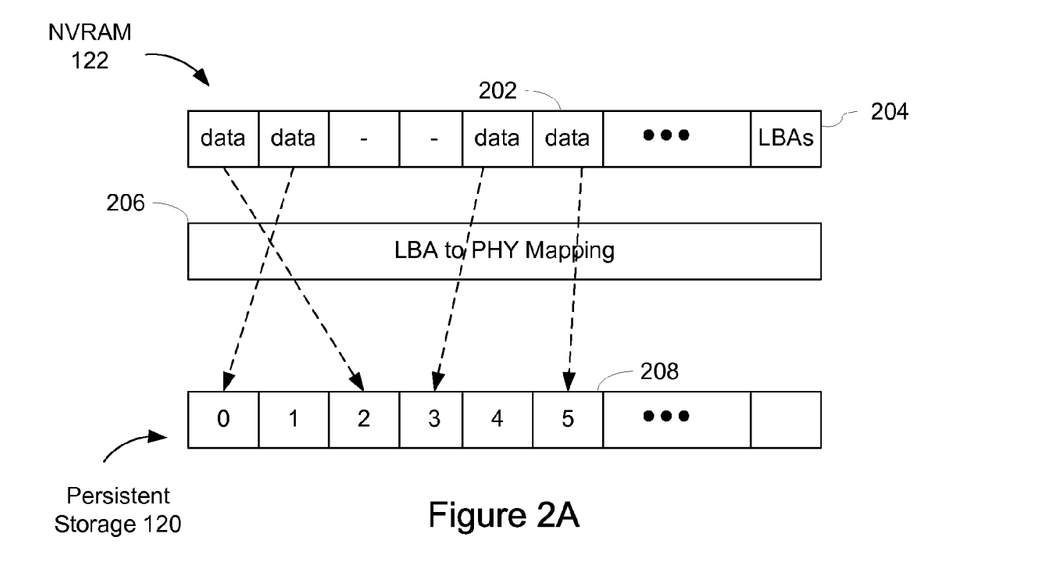
FIG. 2A is a schematic diagram of NVRAM and persistent storage, in accordance with some embodiments.

Address translation function(s) 150 together with address translation tables 152 implement logical block address (LBA) to physical address (PHY) mapping, shown as LBA to PHY mapping 206 in FIG. 2.

As used herein, the term "NVRAM" refers to any type of nonvolatile storage distinct from the type of storage comprising persistent storage 120 that is used to persist small amounts of data. In some implementations, NVRAM is non-volatile storage selected from the set consisting of EPROM, EEPROM, battery backed SRAM, battery backed DRAM, supercapacitor backed DRAM, ferroelectric RAM, magnetoresistive RAM, and phase-change RAM. Supercapacitors are also sometimes called electric double-layer capacitors (EDLCs), electrochemical double layer capacitors, or ultracapacitors.

As used herein, the term "persistent storage" refers to any type of persistent storage, distinct from the type of storage comprising NVRAM, used as mass storage or secondary storage. In some embodiments, persistent storage is flash memory.

In some implementations, persistent storage 120 includes a set of persistent storage blocks, and NVRAM 122 includes a set of NVRAM blocks. In some implementations, the NVRAM blocks have the same size as the persistent storage blocks. Furthermore, in some implementations, the number of NVRAM blocks is much smaller (e.g., 64, 1024, etc.) than the number of persistent storage blocks (e.g., millions to billions, etc.). In some implementations, one or more of the NVRAM blocks is used to store metadata corresponding to the other NVRAM blocks. In one example, a first or last NVRAM block is used to store a logical block address for each NVRAM block to which data has been written by the host 102.

In some embodiments, function calls issued by host 102, using the NVRAM access functions 118 described above, are implemented as input/output control (ioctl) function calls, for example as under Unix or Linux, or similar function calls implemented in other operating systems.

An example of a function call issued by host 102 to write data (e.g., data 119 stored in memory 108 of host 102) to one or more NVRAM blocks, for invoking the write to NVRAM block function 136 in persistent storage device 106, is given by:

sio_host_to_nvram(fd, buf, nvseek, size)

where fd refers to a particular storage device 106, buf refers to a location in memory 108 on host 102 containing data to be written, nvseek refers to the starting position in NVRAM 122 to which the data is to be written, and size refers to an amount of data to be written. In some implementations, the starting location, nvseek, is any byte boundary position in NVRAM 122, and the size refers to the number of bytes to be written from host 102 to NVRAM 122. In some implementations, one of or both nvseek and size may need to be aligned to a word or double word or other such boundary. In some implementations, multiple successive function calls are issued by host 102 to write successive sets of data to the same NVRAM block in NVRAM 122.

An example of a function call issued by host 102 to read data from one or more NVRAM blocks, for invoking the read from NVRAM block function 140 in persistent storage device 106, is given by:

sio_nvram_to_host(fd, nvseek, buf, size)

where fd refers to a particular storage device 106, nvseek refers to the starting position in NVRAM from which data is to be read, buf refers to a location in memory 108 on host 102 into which the read data is to be stored, and size refers to amount of the data to be read. Similarly to the function call issued by host 102 to write data to one or more NVRAM blocks, in some implementations, a function call issued by host 102 to read data from one or more NVRAM blocks is used to read an amount of data smaller than an NVRAM block. In some implementations, the starting location, nvseek, is any byte boundary position in NVRAM 122, and the size refers to the number of bytes to be written from NVRAM 122 to host 102. In some implementations, one of or both nvseek and size may need to be aligned to a word or double word or other such boundary.

An example of a function call issued by host 102 to transfer data from one or more NVRAM blocks to one or more persistent storage blocks, for invoking the transfer NVRAM block to persistent storage block function 138 in persistent storage device 106, is given by:

sio_nvram_to_media(fd, nvseek, pmseek, size)

where fd refers to a particular storage device 106, nvseek refers to the starting position in NVRAM from which data is to be transferred, pmseek refers to the starting location in persistent storage into which the data is to be transferred, and size refers to amount of the data to be transferred. In some implementations, the starting location, pmseek, is a logical block address, and the size refers to an integer number of NVRAM blocks of data to be transferred.

In some embodiments, in the sio_nvram_to_media function call, the size parameter is constrained to specify a number of blocks, the pmseek parameter identifies a logical block address (LBA), and the nvseek parameter identifies an NVRAM block (e.g., identifies the beginning of an NVRAM block). As a result, in these embodiments, the sio_nvram_to_media function call is used by host 102 to transfer the data stored in one or more NVRAM blocks to specified persistent storage blocks.

In some embodiments, data transferred from an NVRAM block to a persistent storage block is not automatically deleted from the NVRAM block by storage controller 124. Rather, such data is deleted only when an explicit command (e.g., a command to erase or overwrite the NVRAM block) is received from host 102. Alternatively, in some implementations, data transferred from an NVRAM block to a persistent storage block is automatically deleted from the NVRAM block by storage controller 124.

Each of the above identified modules, applications or programs corresponds to a set of instructions, executable by the one or more processors of host 102 or persistent storage device 106, for performing a function described above. The above identified modules, applications or programs (i.e., sets of instructions) need not be implemented as separate software programs, procedures or modules, and thus various subsets of these modules may be combined or otherwise re-arranged in various embodiments. In some embodiments, memory 108 or memory 130 optionally stores a subset of the modules and data structures identified above. Furthermore, in some implementations, memory 108 or memory 130 optionally stores additional modules and data structures not described above.

Although FIG. 1 shows a system 100 including host 102 and persistent storage device 106, FIG. 1 is intended more as a functional description of the various features which may be present in a set of servers than as a structural schematic of the embodiments described herein. In practice, and as recognized by those of ordinary skill in the art, items shown separately could be combined and some items could be separated.

FIG. 2A is a schematic diagram of NVRAM 122 and persistent storage 120, in accordance with some embodiments. As illustrated in FIG. 2A, NVRAM 122 contains data that has been stored in NVRAM block(s) 202. In some embodiments, NVRAM 122 also contains a predefined portion 204 for storing one or more logical block addresses, each logical block address in portion 204 corresponds to a respective NVRAM block 202 and also corresponds to a respective persistent storage block 208 in persistent storage 120. After the persistent storage device 106 receives a transfer command, to transfer data in a specified NVRAM block to a corresponding persistent storage block (e.g., a command that invokes the transfer NVRAM block to PS block function 138), storage controller 124 retrieves data from the NVRAM block 202 specified by the transfer command and stores that data to the persistent storage block 208 corresponding to a logical block address specified by the transfer command. Logical block addresses are mapped to physical addresses through LBA to PHY mapping 206, using address translation function(s) 150 and address translation table(s) 152.

In some embodiments, the transfer command received from the host 102 is an instance of the sio_nvram_to_media command discussed above.

In some embodiments, once data is transferred from an NVRAM block to a persistent storage block (e.g., in response to a command from the external host device 102 to transfer data from an NVRAM block to a specified persistent storage block), a copy of the data remains in the NVRAM block until it is overwritten with new data or deleted in response to an explicit command from host 102. In other embodiments, once data is transferred from an NVRAM block to a persistent storage block, the data in the NVRAM block is automatically erased by persistent storage device 106, without receiving any additional command from host 102.

Similarly, in some implementations, once data is transferred from a persistent storage block to an NVRAM block (e.g., in response to a command from the external host device 102 to transfer data from a specified persistent storage block to an NVRAM block), a copy of the data remains in the persistent storage block until it is overwritten with new data or the data in the persistent storage block is deleted in response to an explicit command from host 102. In other implementations, once data is transferred from the persistent storage block to the NVRAM block, the data in the persistent storage block is erased persistent storage device 106, without receiving any additional command from host 102.

Figure 2B:
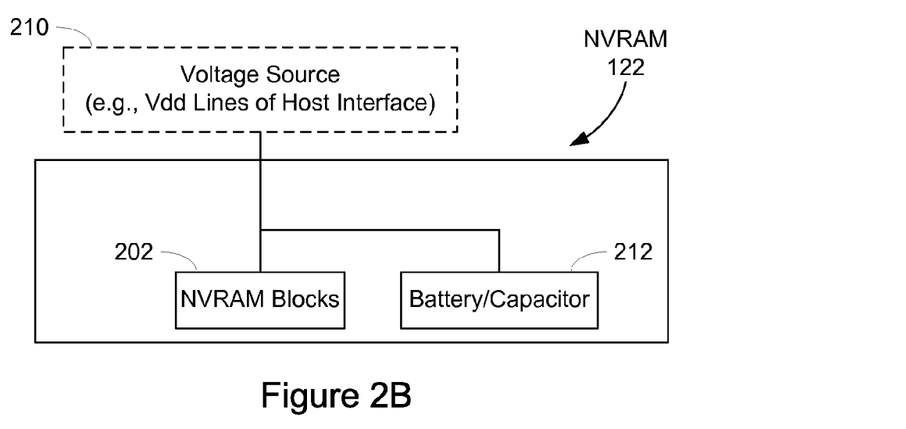
FIG. 2B is a block diagram illustrating an exemplary NVRAM, in accordance with some embodiments.

FIG. 2B is a block diagram illustrating an exemplary NVRAM 122, in accordance with some embodiments. NVRAM 122 is powered by voltage source 210. As mentioned above, some implementations of NVRAM 122 include a battery or capacitor 212 for supplying alternative or reserve power to NVRAM 122 should voltage source 210 become unavailable, thus preserving data in NVRAM blocks 202. In some other implements in which NVRAM 122 is implemented using non-volatile memory that retains data in the absence of power, battery/capacitor 212 is not needed and therefore not included in NVRAM 122.

FIGS. 3A-3D are flow diagrams illustrating the processing of host commands received from host 102 by persistent storage device 106, in accordance with some embodiments. Referring to FIG. 1, in some implementations, the host commands are received from host 102 by persistent storage device 106 via host interface 126. In some implementations, the host commands are function calls issued by host 102 when applications 114 invoke storage access functions 116 and/or NVRAM access functions 118 so as read or write data from or to persistent storage device 106.

Figure 3A:
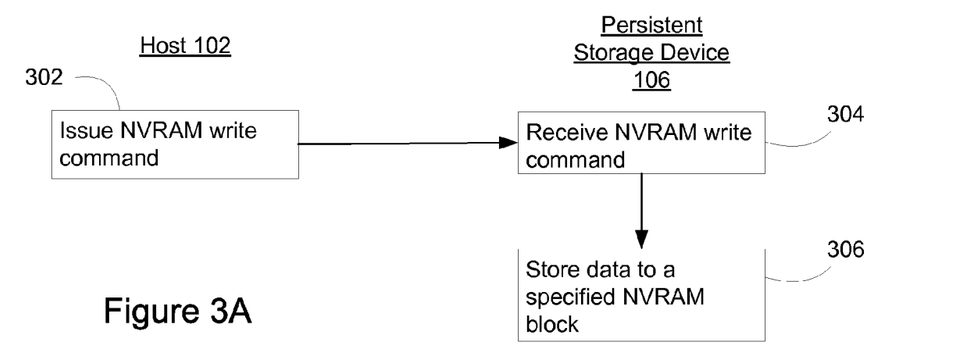
FIGS. 3A-3D are flow diagrams illustrating the processing of host commands by a persistent storage device, in accordance with some embodiments.

FIG. 3A illustrates the processing of an NVRAM write command. Host 102 first issues (302) an NVRAM write command to write data to one or more NVRAM blocks. In some embodiments, the NVRAM write command, e.g., sio_host_to_nvram(fd, buf, nvseek, size), is issued by host 102 when an application 114 executes a corresponding one of the NVRAM access functions 118. Persistent storage device 106 then receives the NVRAM write command (304). Storage controller 124 of persistent storage device 106 then stores the write data to the NVRAM block specified by the NVRAM write command (306). In some embodiments, storage controller 124 stores the write data by executing function 136 so as to write data to one or more specified NVRAM blocks.

Figure 3B:
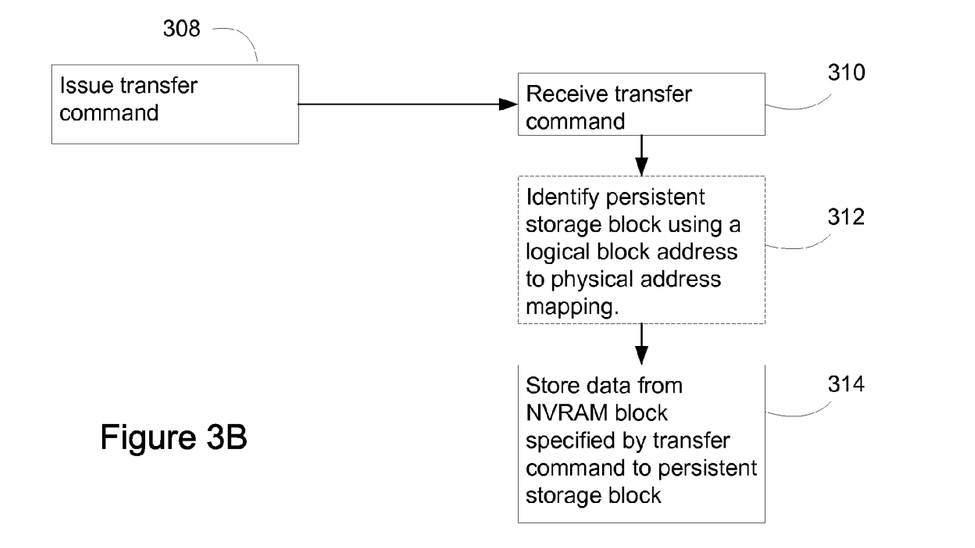

FIG. 3B illustrates the processing of a transfer command. Host 102 first issues (308) a transfer command to transfer data from one or more NVRAM blocks to one or more persistent storage blocks. In some embodiments, the transfer command, e.g., sio_nvram_to_media(fd, nvseek, pmseek, size), is issued by host 102 when an application 114 executes a corresponding one of the NVRAM access functions 118. Persistent storage device 106 receives (310) the transfer command from host 102. The transfer command specifies the persistent storage block to which data is to be written. In particular, in some implementations, the transfer command specifies a logical address, typically called a logical block address, which the storage controller 124 maps to a persistent storage block using a logical block address to physical address mapping 206, as described above, thereby identifying (312) the persistent storage block to which data is to be written. In response to the received command, persistent storage device 106 stores (314) the data from the specified NVRAM block to the persistent storage block specified by the transfer command.

In some embodiments, persistent storage device 106 is configured to handle transfer commands that specify transfers of data from one or more persistent storage blocks to one or more NVRAM blocks. For example, host 102 may issue a sio_media_to_nvram(fd, pmseek, nvseek, size) ioctl call so as to issue such a command. In response to receiving such transfer commands, storage controller 124 invokes execution of the transfer function 142 to transfer data from a specified persistent storage block to an NVRAM block. In some implementations, execution of transfer function 142 includes identifying persistent storage block from which to transfer data using logical address to physical address mapping 206, reading data from the identified persistent storage block, and storing that data to the specified NVRAM block.

In some other embodiments, the transfer of data from persistent storage to NVRAM is accomplished by first issuing a persistent storage read command, as described below with reference to FIG. 3D, and then issuing a subsequent NVRAM write command, as described above with reference to FIG. 3A.

Figure 3C:
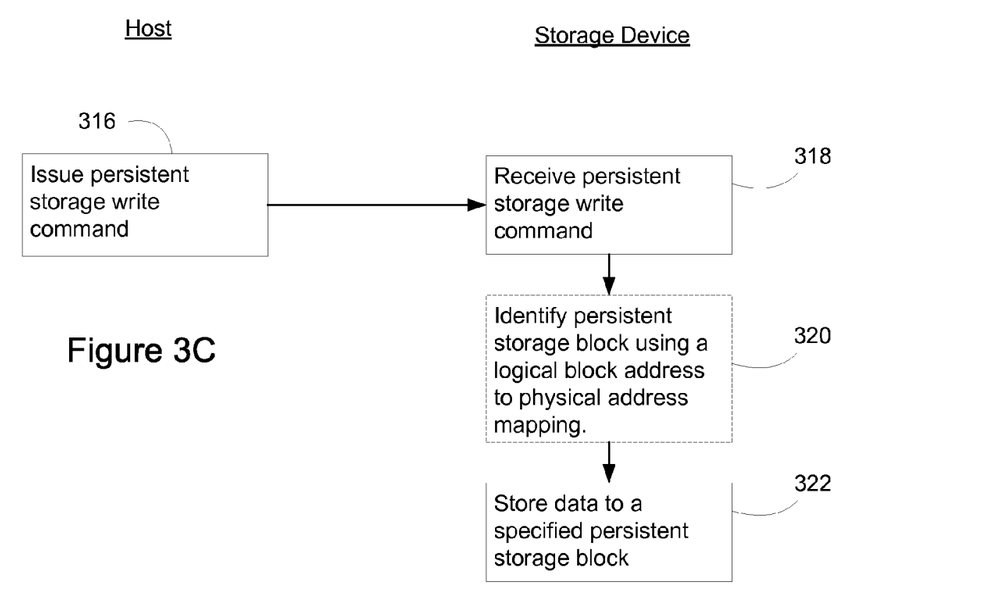

FIG. 3C illustrates the processing of a persistent storage write command. Host 102 issues (308) a persistent storage write command to write data to one or more persistent storage blocks. In some embodiments, the persistent storage write command is issued by host 102 when an application 114 executes a corresponding one of the storage access functions 116. Persistent storage device 106 receives (318) the persistent storage write command. In response to the persistent storage write command, persistent storage device 106 identifies (320) the persistent storage block to which data is to be written, using a logical block address to physical address mapping (e.g., mapping 206) to map a logical address in the received command to a physical address. Next, persistent storage device 106 stores (322) the write data to the identified persistent storage block.

Figure 3D:
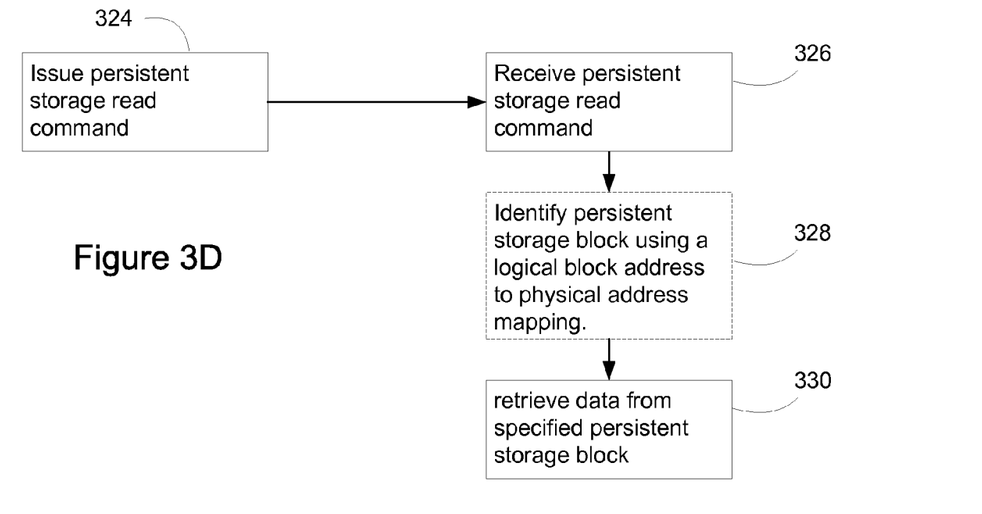

FIG. 3D illustrates the processing of a persistent storage read command. Host 102 issues (324) a persistent storage read command to read data from one or more persistent storage blocks. In some embodiments, the persistent storage read command is issued by host 102 when an application 114 executes a corresponding one of the storage access functions 116. Persistent storage device 106 receives (326) the persistent storage read command. In response to the persistent storage read command, persistent storage device 106 identifies (328) the persistent storage block from which data is to be read, using a logical block address to physical address mapping (e.g., mapping 206) to map a logical address in the received command to a physical address. Next, storage device 106 retrieves (330) the data from the identified persistent storage block. In some embodiments, storage controller 124 retrieves the read data from the identified persistent storage block and returns the data to host 102 via host interface 126. More specifically, in some embodiments, storage controller 124 of persistent storage device 106 reads the data from one or more specified persistent storage blocks and returns the read data to host 102, where the read data is stored in memory 108 (e.g., data 119, FIG. 1).

Figure 4A:
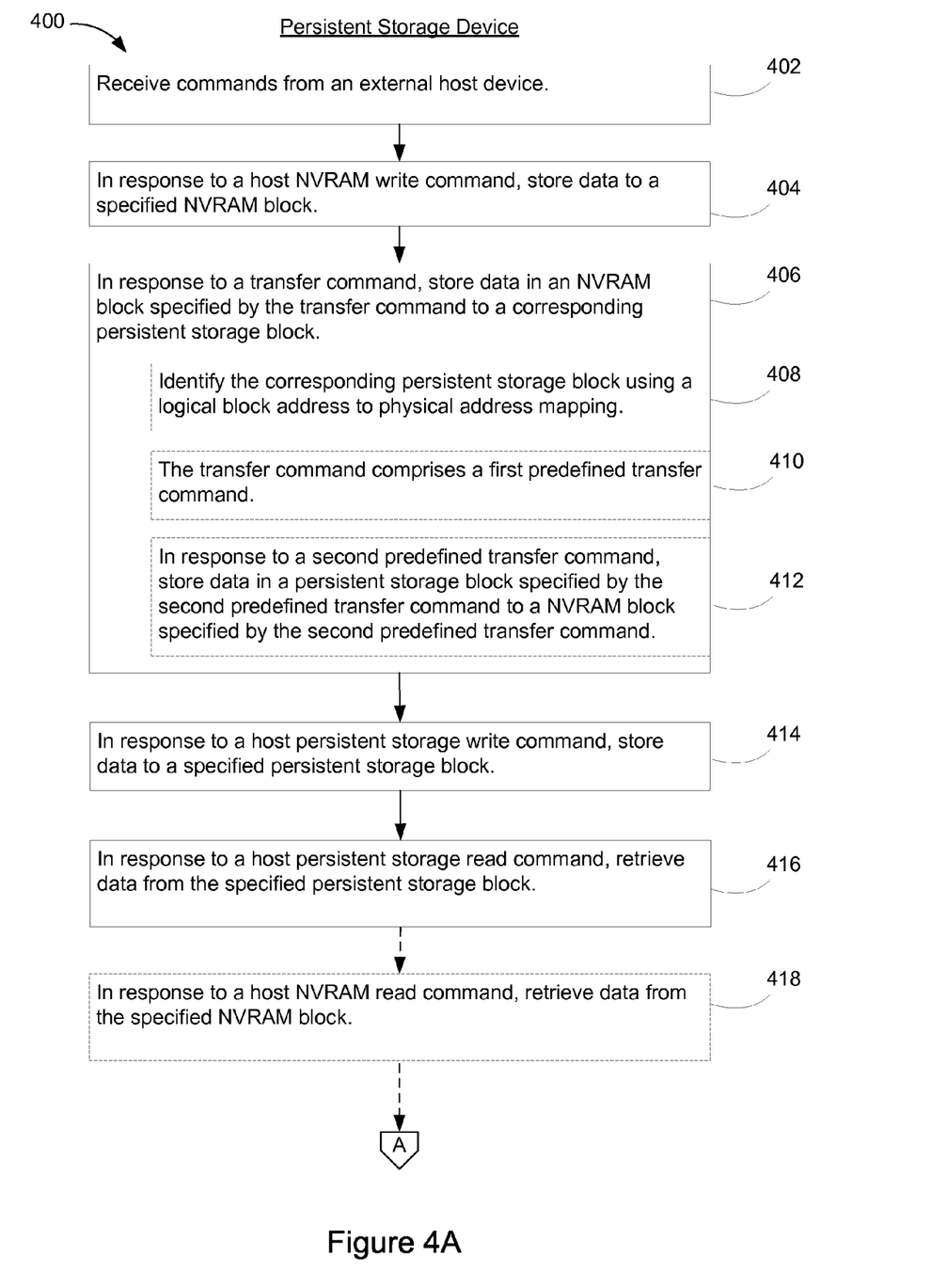
FIGS. 4A and 4B illustrate a flow diagram of a process for managing a persistent storage device having both persistent storage and NVRAM, in accordance with some embodiments.
Figure 4B:
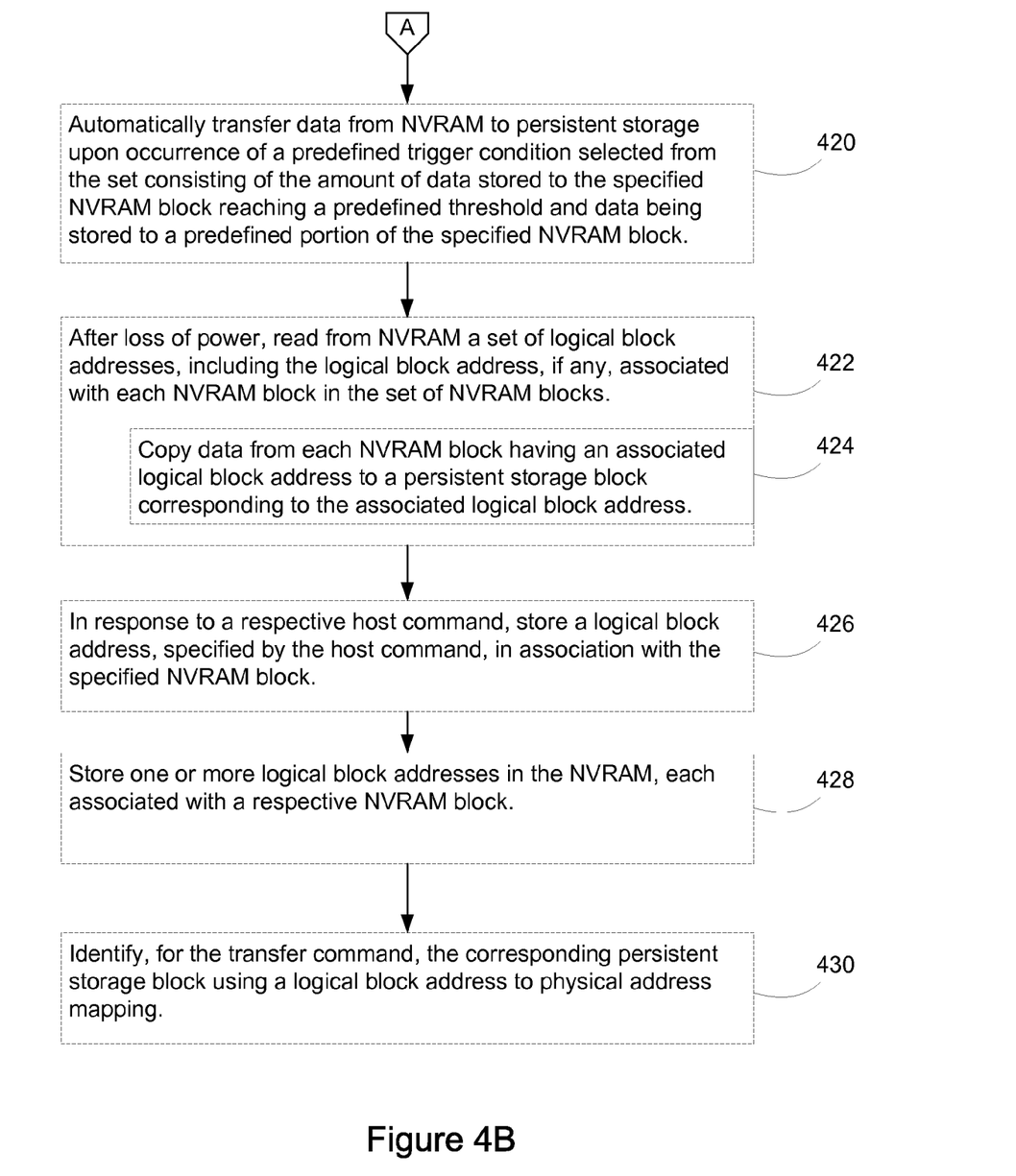

FIGS. 4A and 4B illustrate a flowchart representing a method 400 for managing a persistent storage device, such as persistent storage device 106 shown in FIG. 1, according to some embodiments. In some embodiments, method 400 is governed by instructions that are stored in a computer readable storage medium and that are executed by one or more processors of a device, such as the one or more processors 128 of storage controller 124 of persistent storage device 106, shown in FIG. 1.

In method 400, persistent storage device 106 receives (402) commands (402) from external host device 102. Examples of these commands are sio_host_to_nvram(fd, buf, nvseek, size), sio_nvram_to_host(fd, nvseek, buf, size), sio_media_to_nvram(fd, pmseek, nvseek, size), and sio_nvram_to_media(fd, nvseek, pmseek, size), as described above.

If host 102 issues an NVRAM write command, for example, sio_host_to_nvram(fd, buf, nvseek, size), then in response to the host NVRAM write command, persistent storage device 106 stores (404) data to a specified NVRAM block. In some embodiments, operation 404 corresponds to operation 306 in FIG. 3A, as described above. In the above example of the NVRAM write command, storage controller 124 stores the data, located at position buf in memory 108 of host 102 to position nvseek in NVRAM 122, wherein the quantity of data stored is specified by the size parameter of the command.

If host 102 issues a transfer command, for example, sio_nvram_to_media(fd, nvseek, pmseek, size), then in response to the transfer command, persistent storage device 106 stores (406) data located in an NVRAM block specified by the transfer command to a corresponding persistent storage block in persistent storage device 106. In the above example of the transfer command, storage controller 124 stores the data, located at position nvseek in NVRAM 122 to position pmseek of persistent storage 120, wherein the quantity of data stored is specified by the size parameter of the command. In some implementations, storage controller 124 identifies (408) the corresponding persistent storage block using the logical block address to physical address mapping 206 described above.

In some embodiments, the transfer command comprises (410) a first predefined transfer command. In such embodiments, the first predefined transfer command specifies transferring data from NVRAM to persistent storage, as described above with reference to operation 406. In some embodiments, host 102 also issues a second predefined transfer command, for example, sio_media_to_nvram(fd, pmseek, nvseek, size), that specifies transferring data from persistent storage to NVRAM. In such embodiments, in response to the second predefined transfer command, persistent storage device 106 stores (412) data in a persistent storage block specified by the second predefined transfer command to a NVRAM block specified by the second predefined transfer command. As mentioned above with reference to FIG. 3B, in some embodiments, the same data transfer can be accomplished in two steps, for example, by first issuing a persistent storage read command (as described below with regards to operation 416), and then issuing a subsequent NVRAM write command (as described above with regards to operation 404).

As described above, in some embodiments, the transfer command discussed above with reference to operation 406 specifies the persistent storage block to which data is to be written by specifying an associated logical block address. In such embodiments, the corresponding persistent storage block is identified (430) using a logical block address to physical block address mapping.

If host 102 issues a host persistent storage write command, then in response to the host persistent storage write command, persistent storage device 106 stores (414) data to a specified persistent storage block. If host 102 issues a host persistent storage read command, then in response to the host persistent storage read command, persistent storage device 106 retrieves (416) data from a specified persistent storage block.

If host 102 issues a host NVRAM read command, then in response to the host NVRAM read command, persistent storage device 106 retrieves (418) data from the specified NVRAM block. Operation 418 is similar to operation 416, except instead of reading data from one or more persistent storage blocks, storage controller 124 reads data from one or more NVRAM blocks specified by the NVRAM read command. In some embodiments, operation 418 is executed when an application in host 102 requests data or information that was recently written to NVRAM 122 but that has not yet been transferred to persistent storage 120. In some embodiments, this occurs after a power loss to the host. For example, in some embodiments, after loss of power, storage controller 124 reads (422) from NVRAM 122 a set of logical block addresses 204, including the logical block address, if any, associated with each NVRAM block in the set of NVRAM blocks. In such embodiments, storage controller 124 copies (424) data from each NVRAM block having an associated logical block address to a persistent storage block corresponding to the associated logical block address. For example, as described above with respect to FIG. 2A, in some embodiments NVRAM 122 has a predefined portion 204 for storing one or more logical block addresses, each logical block address in portion 204 corresponds to a respective NVRAM block 202 and also corresponds to a respective persistent storage block 208 in persistent storage 120. In such implementations, the logical block addresses stored in portion 204 of NVRAM 122 are used in operation 424 to identify the persistent storage blocks into which storage controller 124 copies data from the NVRAM blocks that have associated logical block addresses.

In some embodiments, storage controller 124 automatically transfers (420) data from NVRAM 122 to persistent storage 120 upon occurrence of a predefined trigger condition. In some embodiments, the predefined trigger condition is any of the following: the amount of data stored to the specified NVRAM block reaching a predefined threshold, or data being stored to a predefined portion of the specified NVRAM block (e.g., a final portion or last word of the NVRAM block).

In some embodiments, storage controller 124 stores (426), in response to a respective host command, a logical block address, specified by the host command, in association with the specified NVRAM block. With respect to either operation 426 or 428, in some embodiments, storage controller 124 stores (428) one or more logical block addresses in NVRAM 122, each logical block address associated with a respective NVRAM block. For example, as described above with respect to FIG. 2A, in some embodiments NVRAM 122 has a predefined portion 204 for storing one or more logical block addresses, each logical block address in portion 204 corresponds to a respective NVRAM block 202 and also corresponds to a respective persistent storage block 208 in persistent storage 120.

Using the embodiment described above, multiple writes to a particular persistent storage block are replaced with multiple writes to an NVRAM block and a subsequent single write to the particular persistent storage block. This reduces the number of writes to persistent storage and also reduces the number of corresponding block erase operations. Furthermore, performance of the persistent storage device is improved in that writes to NVRAM are faster and expend less energy than writes of the same amount of data to flash memory.

Each of the operations shown in FIGS. 4A and 4B optionally corresponds to instructions stored in a computer memory or computer readable storage medium. The computer readable storage medium optionally includes a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by one or more processors.

Although the terms "first," "second," etc. are used herein to describe various elements, these elements should not be limited by these terms. These terms are only used to distinguish one element from another. For example, a first contact could be termed a second contact, and, similarly, a second contact could be termed a first contact, without changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the disclosed embodiments to the precise forms disclosed. Many modifications and variations are possible in view of the above teachings. The embodiments were chosen and described in order to best explain the principles of the present disclosure and its practical applications, to thereby enable others skilled in the art to best utilize the disclosed embodiments and various other embodiments with various modifications as are suited to the particular use contemplated.

What is claimed is:

1. A persistent storage device, comprising:
persistent storage, comprising a set of persistent storage blocks;
NVRAM, comprising a type of nonvolatile storage distinct from the persistent storage and comprising a set of NVRAM blocks;
a storage controller configured to receive commands from an external host device in accordance with one or more applications executed by the external host device, and further configured to:
  in response to a host NVRAM write command received from the external host device, store data to an NVRAM block specified by the host NVRAM write command;
  in response to a host NVRAM read command received from the external host device, retrieve data from an NVRAM block specified by the host NVRAM read command; and
  in response to a transfer command received from the external host device, transfer data in an NVRAM block specified by the transfer command to a corresponding persistent storage block, wherein the data was previously written to the specified NVRAM block.

2. The persistent storage device of claim 1, wherein the storage controller is further configured to:
  in response to a host persistent storage write command, store data to a persistent storage block; and
  in response to a host persistent storage read command, retrieve data from a persistent storage block.

3. The persistent storage device of claim 1, wherein the persistent storage device is implemented as a single, monolithic integrated circuit.

4. The persistent storage device of claim 1, wherein the persistent storage comprises flash memory, and the NVRAM comprises non-volatile storage selected from the set consisting of EPROM, EEPROM, battery backed SRAM, battery backed DRAM, supercapacitor backed DRAM, ferroelectric RAM, magnetoresistive RAM, and phase-change RAM.

5. The persistent storage device of claim 1, further comprising a host interface for interfacing the persistent storage device to a memory controller of the external host device.

6. The persistent storage device of claim 1, wherein a logical block address is associated with the specified NVRAM block, and the corresponding persistent storage block corresponds to the logical block address.

7. The persistent storage device of claim 1, wherein the storage controller is further configured to respond to a respective host command by storing a logical block address, specified by the host command, in association with the specified NVRAM block.

8. The persistent storage device of claim 1, wherein a predefined portion of the NVRAM stores one or more logical block addresses, each associated with a respective NVRAM block.

9. The persistent storage device of claim 1, wherein a logical block address is associated with the specified NVRAM block, and the corresponding persistent storage block is identified by the storage controller using a logical block address to physical address mapping.

10. The persistent storage device of claim 1, wherein
the transfer command comprises a first predefined transfer command, and
the storage controller is further configured to respond to a second predefined transfer command by storing data in a persistent storage block specified by the second predefined transfer command to an NVRAM block specified by the second predefined transfer command.

11. A method for managing a persistent storage device, comprising:
at the persistent storage device comprising persistent storage and NVRAM, the persistent storage comprising a set of persistent storage blocks and the NVRAM comprising a type of nonvolatile storage distinct from the persistent storage and comprising a set of NVRAM blocks:
  receiving commands from an external host device in accordance with one or more applications executed by the external host device;
  in response to a host NVRAM write command received from the external host device, store data to an NVRAM block specified by the host NVRAM write command;
  in response to a host NVRAM read command received from the external host device, retrieve data from an NVRAM block specified by the host NVRAM read command; and
  in response to a transfer command received from the external host device, storing data in an NVRAM block specified by the transfer command to a corresponding persistent storage block.

12. The method of claim 11, further comprising:
  in response to a host persistent storage write command, store data to a persistent storage block; and
  in response to a host persistent storage read command, retrieve data from a persistent storage block.

13. The method of claim 11, wherein the persistent storage device is implemented as a single, monolithic integrated circuit.

14. The method of claim 11, wherein the persistent storage comprises flash memory, and the NVRAM comprises non-volatile storage selected from the set consisting of EPROM, EEPROM, battery backed SRAM, battery backed DRAM, supercapacitor backed DRAM, ferroelectric RAM, magnetoresistive RAM, and phase-change RAM.

15. The method of claim 11, wherein the persistent storage device further comprises a host interface for interfacing the persistent storage device to a memory controller of the external host device.

16. The method of claim 11, wherein a logical block address is associated with the specified NVRAM block, and the corresponding persistent storage block corresponds to the logical block address.

17. The method of claim 11, further comprising, at the persistent storage device, responding to a respective host command by storing a logical block address, specified by the host command, in association with the specified NVRAM block.

18. The method of claim 11, further comprising, at the persistent storage device, storing one or more logical block addresses in the NVRAM, each associated with a respective NVRAM block.

19. The method of claim 11, further comprising, at the persistent storage device, identifying, for the transfer command, the corresponding persistent storage block using a logical block address to physical address mapping.

20. The method of claim 11, wherein the transfer command comprises a first predefined transfer command, the method further comprising, at the persistent storage device, in response to a second predefined transfer command, storing data in a persistent storage block specified by the second predefined transfer command to an NVRAM block specified by the second predefined transfer command.

21. The method of claim 11, further comprising, at the persistent storage device, automatically transferring data from NVRAM to persistent storage upon occurrence of a predefined trigger condition selected from the set consisting of the amount of data stored to the specified NVRAM block reaching a predefined threshold and data being stored to a predefined portion of the specified NVRAM block.

22. The method of claim 11, further comprising, under control of the external host device:
    after loss of power, reading from NVRAM a set of logical block addresses, including the logical block address, if any, associated with each NVRAM block in the set of NVRAM blocks; and
    copying data from each NVRAM block having an associated logical block address to a persistent storage block corresponding to the associated logical block address.

23. A method for storing data to a persistent storage device, comprising:
    at a host device external to the persistent storage device and issuing commands in accordance with one or more applications executed by the host device:
        issuing a plurality of NVRAM write commands to store data in blocks of NVRAM in the persistent storage device specified by the NVRAM write commands, the persistent storage device comprising persistent storage and NVRAM, the persistent storage comprising a set of persistent storage blocks and the NVRAM comprising a set of NVRAM blocks that includes the specified blocks of NVRAM, wherein the NVRAM comprises a type of nonvolatile storage distinct from the persistent storage;
        issuing an NVRAM read command, instructing the persistent storage device to retrieve data from an NVRAM block in the persistent storage device specified by the NVRAM read command;
        issuing a predefined transfer command, instructing the persistent storage device to store data in an NVRAM block specified by the transfer command to a corresponding persistent storage block, wherein the data was previously written to the specified NVRAM block by one of the issued NVRAM write commands; and
        issuing a read command, instructing the persistent storage device to retrieve data from the persistent storage block to which data was stored in accordance with the predefined transfer command issued by the host device, and to convey to the host device the data retrieved from the persistent storage block to which data was stored in accordance with the predefined transfer command issued by the host device.

* * * * *